(No Model.) 2 Sheets—Sheet 1.
H. & G. ROSE.
GRANULATING DISK.
No. 605,452. Patented June 7, 1898.
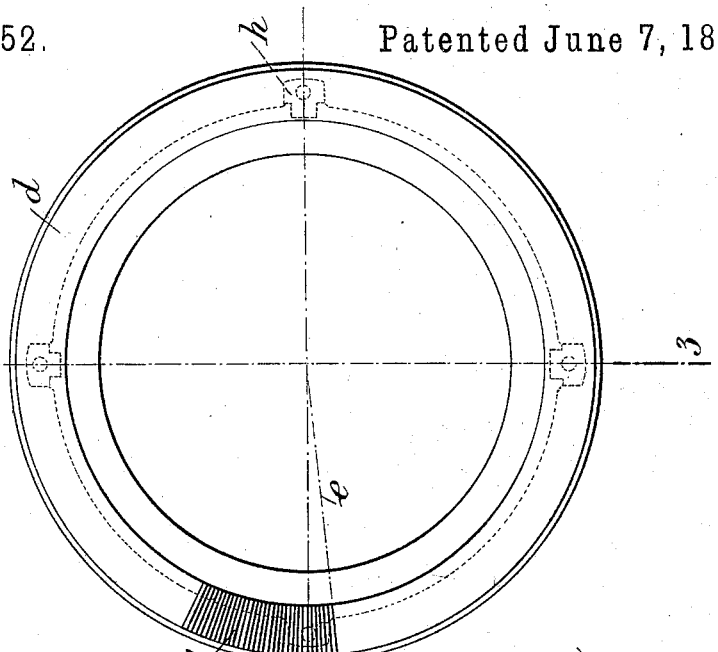
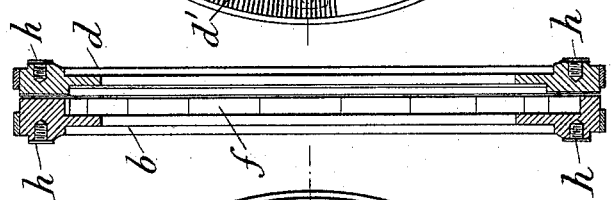
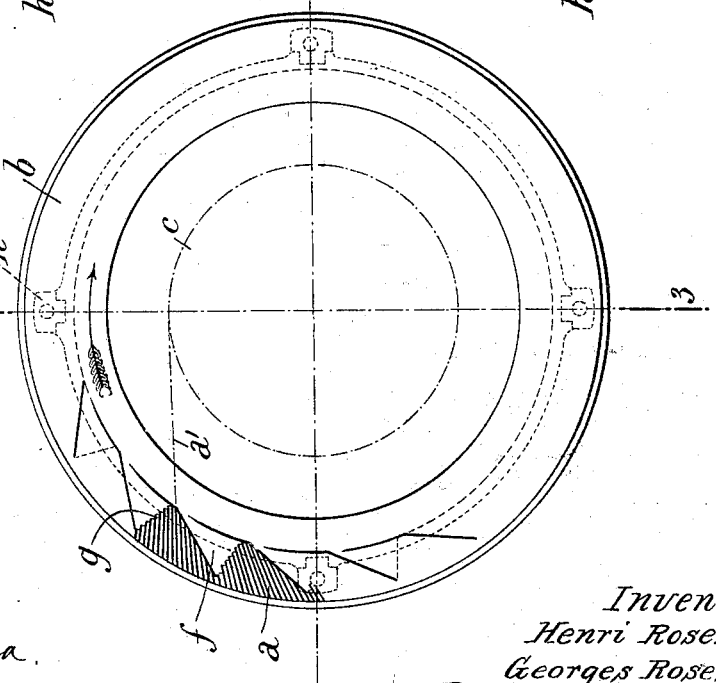
Witnesses.
Geo. W. Rea.
Robert Garrett.
Inventors.
Henri Rose.
Georges Rose.
By James L. Norris.
Atty.

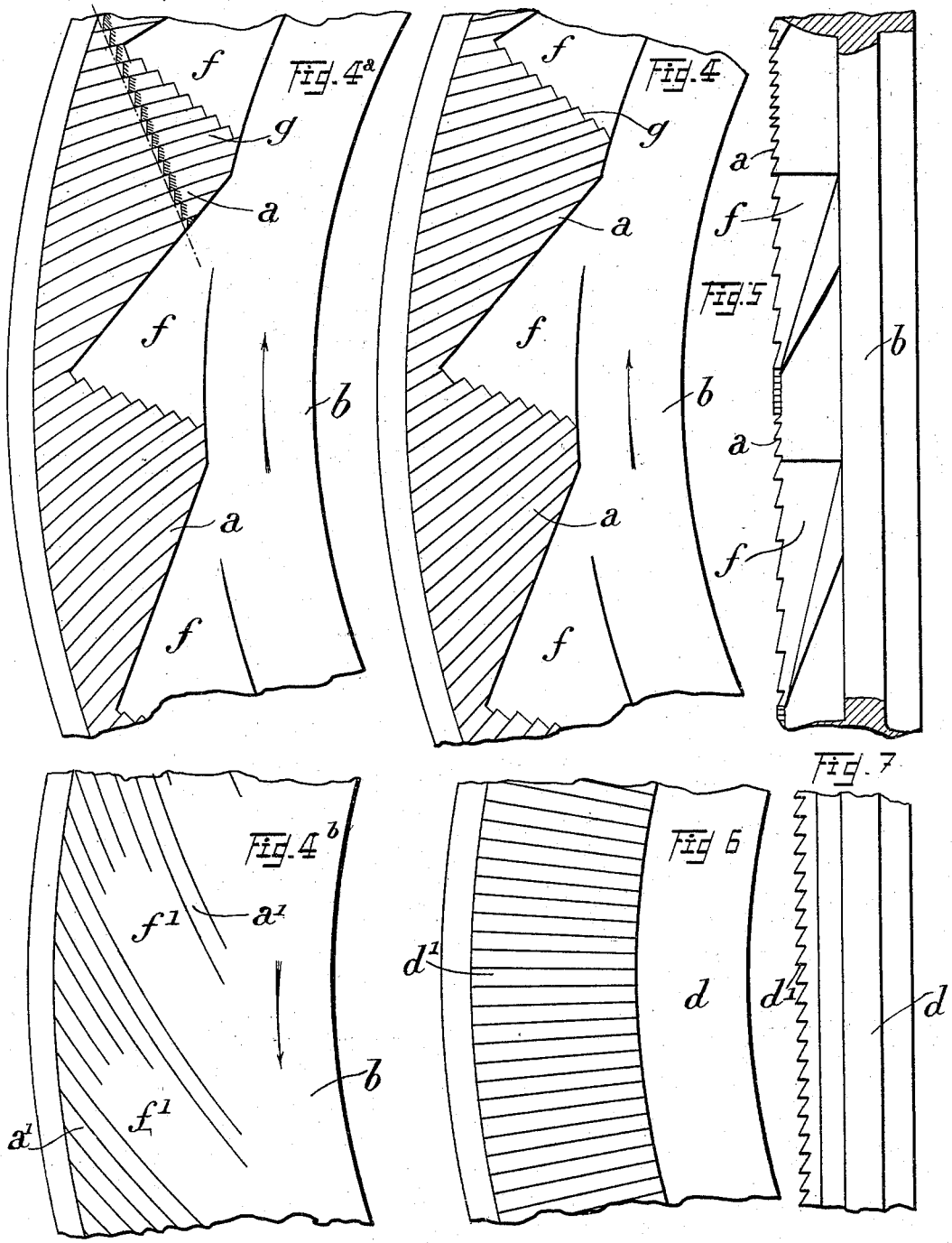

UNITED STATES PATENT OFFICE.

HENRI ROSE AND GEORGES ROSE, OF POISSY, FRANCE.

GRANULATING-DISK.

SPECIFICATION forming part of Letters Patent No. 605,452, dated June 7, 1898.

Application filed June 11, 1896. Serial No. 595,200. (No model.) Patented in France October 24, 1889, No. 201,532.

*To all whom it may concern:*

Be it known that we, HENRI ROSE and GEORGES ROSE, manufacturers, citizens of the Republic of France, residing at Poissy, Seine-et-Oise, France, have invented certain new and useful Improvements in Granulating-Disks for Corn and other Mills, (for which we have been granted two certificates of addition, dated May 10, 1890, and October 25, 1890, annexed to our French patent of October 24, 1889, No. 201,532,) of which the following is a specification.

This invention relates to granulating-disks which are intended to be employed in corn-mills and the like for breaking, crushing, or granulating the grain to a greater or less degree of fineness.

Our invention consists, essentially, in a novel arrangement of the grooves, flutes, or channels in our improved granulating-disks and also in the omission, according to a special scheme, of a portion of said grooves, flutes, or channels at certain determined places, so as to produce what are known as "inlets" or "entry-places" for the introduction of the grain to be treated between the granulating-disks.

In the accompanying drawings, in which the same letters of reference serve to indicate similar parts in all cases where they are repeated, Figure 1 is a front elevation of the rotary granulating-disk, which when the mill is working rotates in the direction indicated by the arrow in this figure. Fig. 2 is a front elevation corresponding to Fig. 1 of the fixed granulating-disk, which coöperates with the movable or rotary disk to crush or "granulate" the grain. Fig. 3 is a cross-section on the lines 3 3, respectively, of Figs. 1 and 2, showing the two disks (fixed and rotary) placed near to each other in such a manner as to coöperate one with the other. Fig. 4 is a detail view, on a larger scale, corresponding with Fig. 1 of a portion of the rotary or movable granulating-disk, showing the arrangement of the furrows or grooves and of the inlets or entry places. Fig. 5 is a side elevation of the same, looking toward the left hand in Fig. 4. Fig. 4$^a$ is a detail view similar to Fig. 4, of a portion of the rotary granulating-disk, showing a modification of the arrangement of the furrows or grooves, which are of curvilinear form instead of being rectilinear, as in the first arrangement. Fig. 4$^b$ is a similar detail view illustrating a modification having curved or curvilinear furrows, with a slightly-different arrangement of inlets for the introduction of the grain. Fig. 6 is a view corresponding to Fig. 4 of a portion of the fixed granulating-disk; and Fig. 7 is a side elevation thereof, looking toward the left in Fig. 6.

The first of the improvements applied to our granulating-disks consists, essentially, in the type, contour, and direction of the furrows formed in each of these disks (fixed and rotary) with the object of effecting a better yield, a more uniform action upon and a more uniform distribution of the grain, and consequently a less unequal wear of the disks, and, in general, a more efficient working, the direction of these furrows being such as to insure the most useful result by reason of their crossing during working.

In Figs. 1 and 4 the furrows $a$ of the rotary disk $b$ instead of being curvilinear, as in some arrangements employed heretofore and as they are, in fact, in the arrangements in Figs. 4$^a$ and 4$^b$, are straight and are not radial. In other words, instead of being directed from the periphery toward the center they are directed, as indicated by the dotted line $a'$, Fig. 1, tangentially to an imaginary circle $c$, (indicated by dotted lines in Fig. 1,) the diameter of which circle is shown in exact proportion in this figure with reference to the diameter of the outer periphery of the movable disk $b$ and is practically equal to half the diameter of the said outer circumference. This ratio is, however, not absolute and may be slightly departed from to a greater or less extent according to circumstances.

In some cases and according to the kind of work to be done we may, while following the same principle, make the furrows or grooves of the curvilinear form shown in Fig. 4$^a$ or even as shown in Fig. 4$^b$ instead of the rectilinear form. In this case the furrows $a$ instead of being directed according to straight lines tangential to a circle—such as the circle $c$, Fig. 1—are made in the form of arcs of a circle, also tangential to an inner circle which is concentric with the circumference of the disk and whose diameter may vary according to circumstances.

The furrows or grooves $d'$ of the fixed disk $d$, Figs. 2 and 6, are radially arranged—that is to say, they are directed from the periphery toward the center of the disk, as indicated by the dotted line $e$ of Fig. 2.

The second improvement which we have made in the movable disk $b$ consists in forming on the operative face of said disk depressed portions or inlets $f$, designed to facilitate the feeding of the corn or other grain between the two disks $b$ and $d$, and which we preferably make of the triangular shape shown in Figs. 1 and 4.

In the arrangement shown in Fig. 4$^b$ the inlets $f'$ have a slightly-different form, but they act in the same manner as the feed-inlets $f$ just described, as will be understood on comparing the figures together.

As shown in Fig. 3, when the two disks $b$ $d$ are in position for coöperation their operative faces are parallel to each other and the grain can enter between the disks only through the feed-inlets $f$, (or $f'$ in the case of the disk in Fig. 4$^b$,) which act as so many inlet-orifices. By reason of this arrangement of the said feed-inlets the grain becomes uniformly distributed on the edges $g$, along which it passes into the furrows or grooves $a$, and is brought to the periphery. This arrangement has for result a more uniform wear of the disks, a better hold or action on the grain which when once caught cannot escape, and a more regular or uniform grinding effect.

Our granulating-disks are provided on their inoperative face with bearing-surfaces $h$, tapped with screw-threads, Figs. 1, 2, and 3, which serve to receive the screws or bolts by means of which these disks are attached to the adjustable disk-carrying plates of the mills in which they are used.

Before being granulated or crushed the grain must be split and cleaned—that is to say, the two lobes of the grain must be separated and freed from the hairs or beard situated at one end and also from the germ and the germ-inclosing cell situated at the other end. This twofold result may be effected by means of any suitable splitting and germ-removing disks.

What we claim as our invention is—

The herein-described pair of granulating-disks for corn and other mills, the same consisting of the stationary granulating-disk having its acting face composed of an annular crown provided with rectilinear furrows radiating from the central portion of the disk to the circumference, and the rotary granulating-disk having its acting face constituted by an annular crown provided with a series of furrows which are directed from the circumference tangentially to an imaginary circle concentric with the said disk and having depressed triangular inlets interrupting said tangential furrows at regular intervals, the said stationary disk and rotary disk being arranged to operate with their acting faces opposite to and parallel with each other, and each disk having the exterior acting edges of all its furrows in the same plane, substantially as specified.

In testimony whereof we have hereunto set our hands in presence of two subscribing witnesses.

HENRI ROSE.
GEORGES ROSE.

Attest:
CLYDE SHROPSHIRE,
D. H. BRANDON.